United States Patent
Andersen et al.

(10) Patent No.: US 7,243,402 B2
(45) Date of Patent: Jul. 17, 2007

(54) LOCKING CLIP

(75) Inventors: Todd D Andersen, Whatcom County, WA (US); Robert M Cameron, Whatcom County, WA (US)

(73) Assignee: The Phoenix Product Design Group LLC, Issaquah, WA (US)

( * ) Notice: Subject to any disclaimer, the term of this patent is extended or adjusted under 35 U.S.C. 154(b) by 0 days.

(21) Appl. No.: 10/388,924

(22) Filed: Mar. 13, 2003

(65) Prior Publication Data

US 2004/0081512 A1    Apr. 29, 2004

Related U.S. Application Data

(60) Provisional application No. 60/364,208, filed on Mar. 13, 2002.

(51) Int. Cl.
*A41F 11/00* (2006.01)

(52) U.S. Cl. .............................. 24/532; 24/517; 24/519

(58) Field of Classification Search ............... 24/512, 24/517, 521, 529, 544, 537, 507, 72.5, 515, 24/531, 329–332, 349, 16 PB, 132 R, 518, 24/519, 520, 532; 81/383, 407; 248/316.5, 248/36.7, 339
See application file for complete search history.

(56) References Cited

U.S. PATENT DOCUMENTS

| | | | | |
|---|---|---|---|---|
| 380,125 A * | 3/1888 | Lewis | ......................... | 24/507 |
| 681,313 A * | 8/1901 | Hammond | .................... | 24/499 |
| 694,253 A * | 2/1902 | Conant | ......................... | 24/519 |
| 829,118 A * | 8/1906 | Meek | ............................ | 24/507 |
| 836,957 A * | 11/1906 | Alexovits | ...................... | 24/507 |
| 1,077,257 A * | 11/1913 | Chattelle et al. | .......... | 24/132 R |
| 1,213,392 A * | 1/1917 | MaLoney | ...................... | 24/507 |
| 1,877,006 A * | 9/1932 | Merryman | .................. | 24/72.5 |
| 2,171,665 A * | 9/1939 | Meltzer | .................... | 248/316.7 |
| 2,499,517 A * | 3/1950 | Marini | ......................... | 24/532 |
| 2,508,628 A * | 5/1950 | Stender | ........................ | 24/532 |
| 2,766,500 A * | 10/1956 | Chanko | ........................ | 24/507 |
| 3,097,407 A * | 7/1963 | Winchell | ...................... | 24/327 |
| 3,780,402 A * | 12/1973 | Takabayashi | ................ | 24/510 |
| 3,914,828 A * | 10/1975 | Noda | ............................ | 24/507 |
| 3,992,758 A * | 11/1976 | Noda | ............................ | 24/521 |
| 4,084,299 A * | 4/1978 | Noda | ............................ | 24/507 |
| 4,463,482 A * | 8/1984 | Hawie | ........................... | 24/489 |

\* cited by examiner

*Primary Examiner*—Jack W. Lavinder
(74) *Attorney, Agent, or Firm*—Todd N. Hathaway

(57) ABSTRACT

A clip assembly having first and second pivoting gripping members that are locked in gripping engagement to a tarp or other material and attached to a rope or shock cord. The gripping members include jaws and arms that are joined by a pivot connection so that the jaws are forced into engagement when the arms are pressed together. At least one of the arms is formed of a resiliently flexible material so that the arm bends as the jaws are forced into gripping engagement. There is a hook or other attachment portion on one of the arms that the arms are locked in the compressed position when a portion of the cord is passed therethrough. The hook may include a primary opening for receiving a bight of a rope and a secondary opening for receiving a hook on the end of a shock cord.

9 Claims, 10 Drawing Sheets

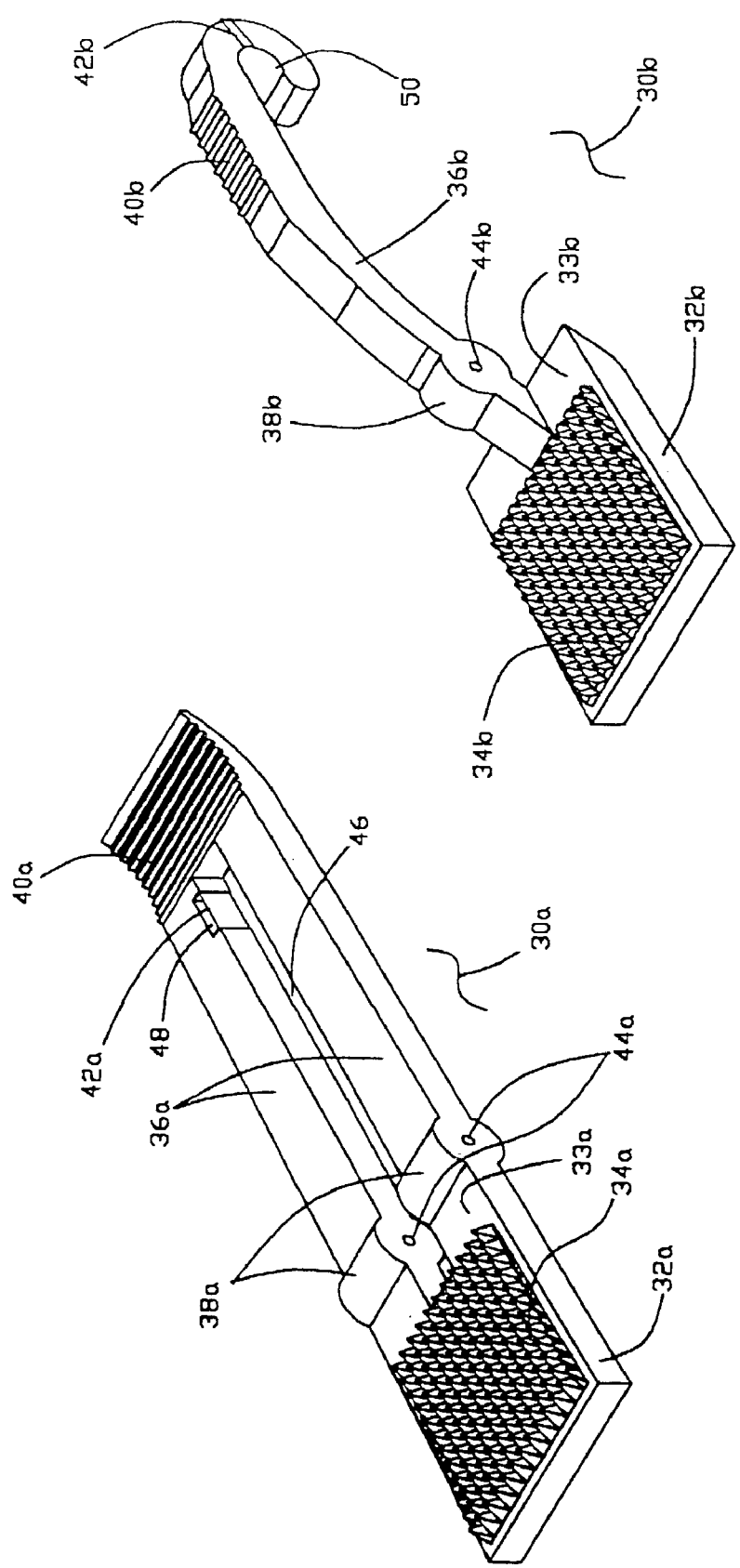

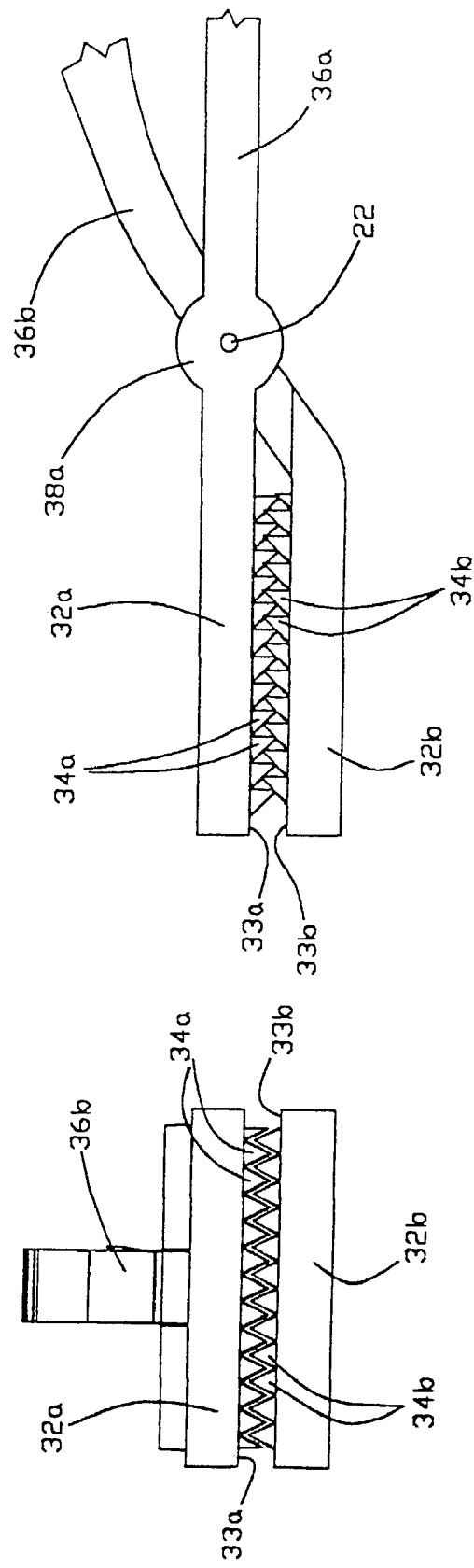

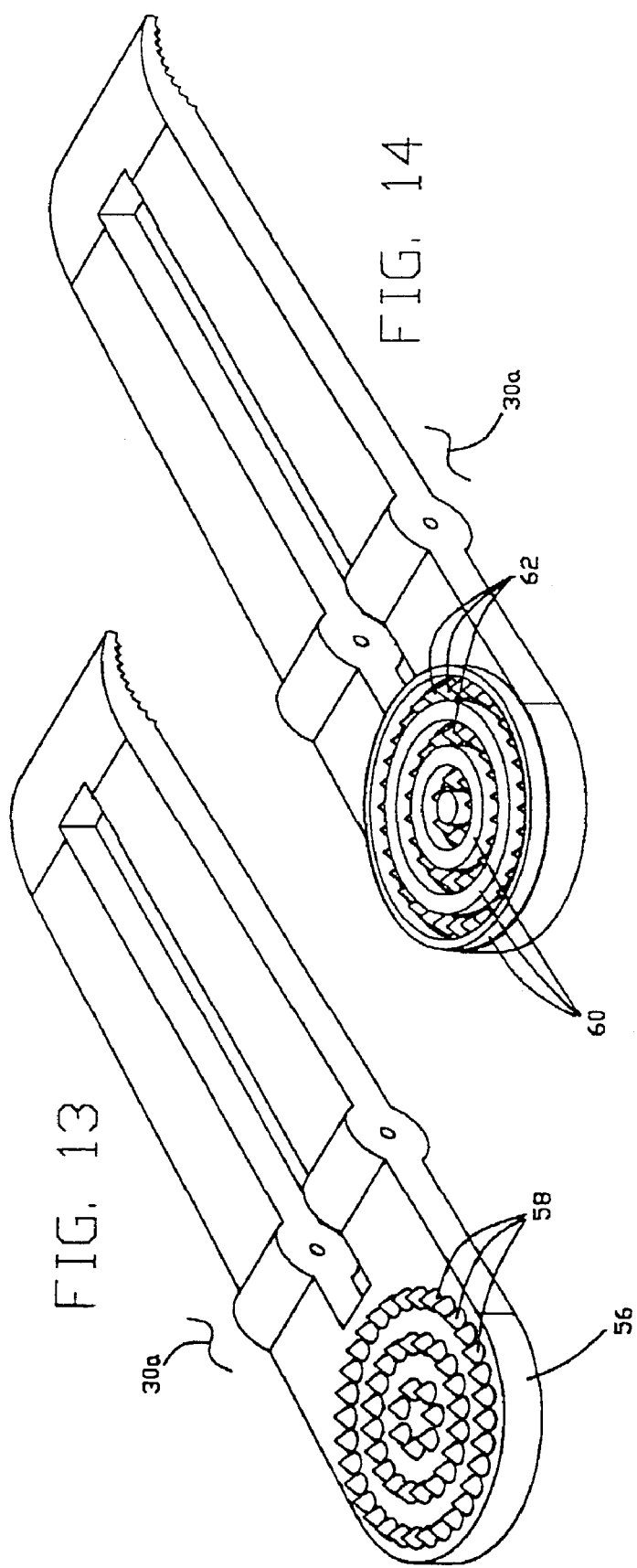

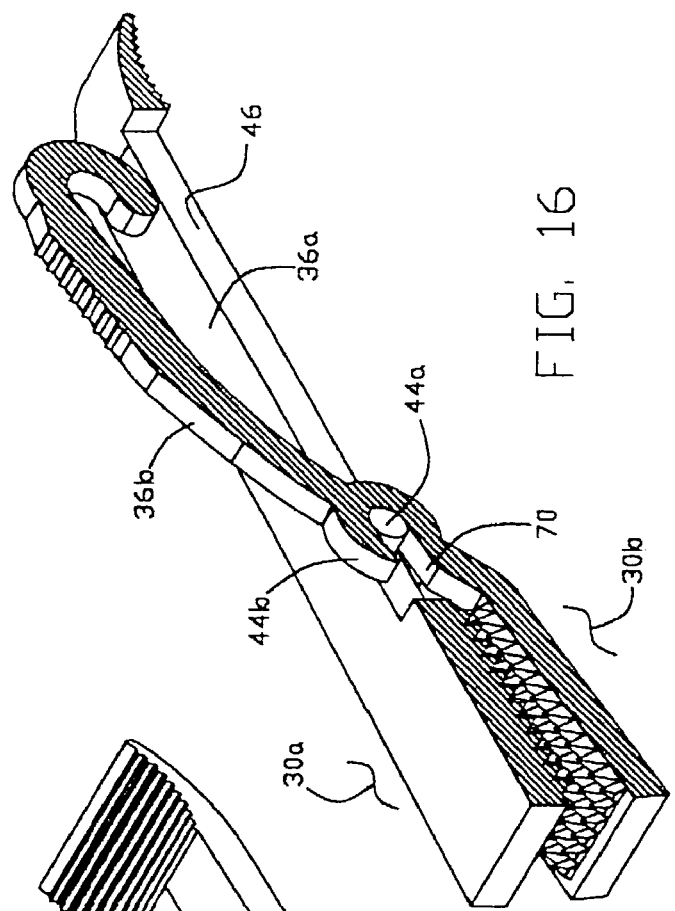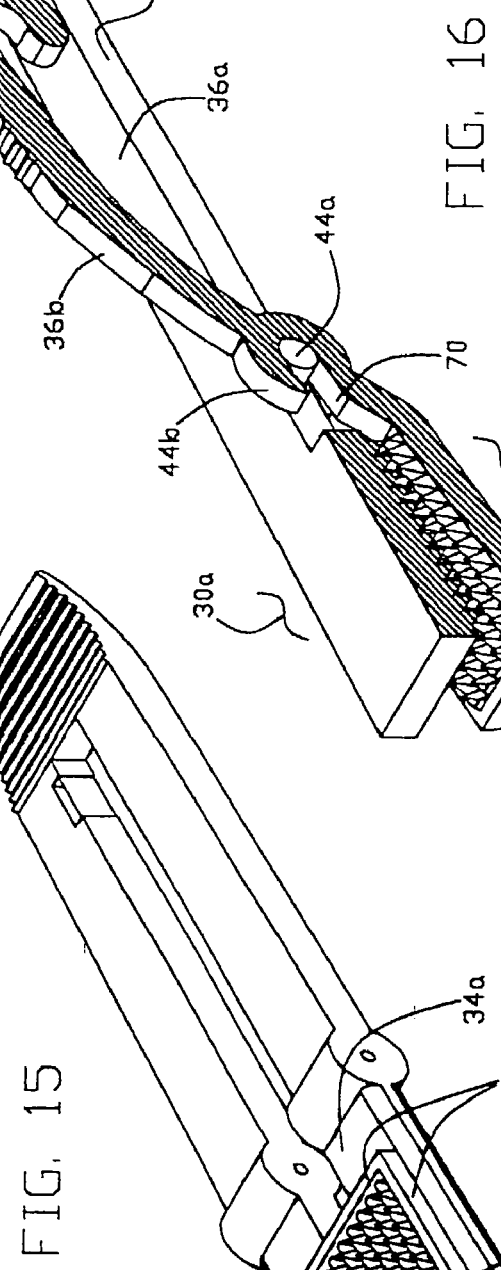

LOCKING CLIP

This application claims the priority of U.S. provisinal patent application Ser. No. 60/364,208, filed on 13 Mar. 2002.

BACKGROUND OF THE INVENTION a. Field of the Invention

The present invention relates generally to clips and similar gripping devices and, more particularly, to a locking clip that grips sheets of cloth, plastic or other material b. Background Art Numerous clips and other gripping devices have been proposed for gripping or cloth, plastic or other sheet-type materials. Some common examples include suspender clips for gripping pants, clothespins for securing clothing to the drying line, and binder clips for binding stacks of paper. Adaptations on clips of this nature have been used as an improvised means of securing canvas tarps or plastic sheets in an attempt to protect articles from environmental conditions, and certain gripping devices have evolved specifically for this type of application.

Tarps and other sheet coverings of course have a multitude of uses. For example, boaters commonly protect the deck and cockpits of their craft using canvas coverings. Normally such protective coverings are fitted with grommets and secured with rope. However, with age and weathering, the grommets often fail or the canvas deteriorates and supplemental means are required to secure the existing cover. As an inexpensive alternative to a new cover, a plastic tarp may be substituted. In either case, an alternative means for securing the cover is required.

During camping excursions it is common to see makeshift shelters erected from plastic tarps to protect the campsite occupants and gear from sun and rain. The tarps are often secured to trees via cord attached to corner grommets. However, the grommets are often inadequate in terms of number, spacing, or strength to provide the necessary support. As a result, the shelters typically fail due to wind loads or rain accumulation. Additional means for securing these types of temporary tarp shelters would be beneficial.

Tarps or other protective coverings are also commonly used to shelter goods during road transport by pickup trucks and automobiles with trailers in tow. Often times the tarps have no convenient means for securing them to the vehicle, and, as a result, they noisily flap in the wind and risk being ripped from the vehicle possibly resulting in a dangerous traffic situation. Commercial vehicles, such as dump trucks, often employ coverings to prevent construction site dirt and debris from blowing out of the vehicle during highway transport, and commercial trucking fleets often use curtain-like coverings on their trailers to shelter transported goods. Although sometimes these coverings have integrated securing mechanisms, failures in the mechanisms or reconfiguration to accommodate unanticipated changes in the load being transported requires a cover securing means that is easily adaptable to the new situation.

In many instances sheet material can also be used to provide temporary or semi-permanent coverings on a much larger scale. For example, large expanses of plastic sheeting are often used as temporary cover in the construction and civil engineering industries, e.g., to provide cover for a construction area or road resurfacing/repair. Such large installations call for an effective, inexpensive and rapidly installed attachment for securing the edge of the plastic sheeting material. Moreover, such material (for example, Visqueen™) typically lacks any form of grommets or similar structures that might be used as attachment points.

In all of these examples it would therefore be desirable to have an inexpensive gripping device that could be quickly and easily attached to the edge of the tarp or other covering such that it could be securely affixed by a rope or cord. The prior devices developed to accommodate this need are often inconvenient to implement and limited in their usage. Furthermore, these devices often fail themselves due to structural inadequacies or cause damage to the attached sheet material which subsequently fails; or they simply do not supply enough grip pressure to stay connected to the sheet material. Finally, considering the number of prior devices that may be required to safely secure the sheet material, the expense of such devices is often prohibitive.

Accordingly, there exists a need for a clip device for engaging and securing fabric, cloth, plastic or other sheet material, whether flexible or somewhat rigid, which is quickly and easily attached or removed and is easily adaptable to many materials and situations. Furthermore, there is a need for such a device that can be attached to a rope or cord in a rapid and convenient matter. Still further, there is a need for such a device that provides excellent grip and structural strength without compromising the integrity of the gripped material. Moreover, there is a need for such a device that is economical to manufacture.

SUMMARY OF THE INVENTION

The present invention has solved the problems cited above, and is a locking clip assembly for gripping and securing a tarp or other sheet of material.

In a preferred embodiment, the clip assembly comprises (a) first and second jaw members arranged in opposition to one another, each jaw member comprising a grip portion for engaging the sheet of material; (b) first and second resilient lever arm members extending from the first and second jaw members respectively and crossing one another at a common pivot point, the lever arms providing means for resiliently biasing said jaws into engagement with leveraged pliers-like force; (c) a hinge mechanism located at the intersection where the lever arms cross and providing a common pivot point for activating the jaws via the lever arms; and (d) a securement element that concurrently provides means for connecting the device to a rope, shock cord, "bungee" cord, or other attachment element and which further serves to lock the lever arms in the compressed position until the attachment element is removed.

The opposing first and second jaw members may each comprise a generally planar face to which the grip portion may be integrally joined and which defines the contact area for engaging the sheet of material. The generally planar faces of the opposing jaws may be arranged in a manner such that, when the jaws are closed on each other, their planes slightly diverge and intersect along an axis parallel with the hinge axis, but become parallel when a sheet of material of typical nominal thickness is engaged between them. The grip portion on each jaw may comprise a rectangular array of teeth for engaging and retaining the sheet material. The array of teeth on the first grip face may be configured to be received in the valleys between the array of teeth on the second grip face, and vice versa; and each individual tooth may be raked back towards the hinge point and away from the sheet material to provide more tenacious gripping action.

The first lever arm may be a generally rectangular integral extension of the first jaw member and as such extends linearly and parallel to the grip face and substantially through the hinge point. This first lever arm may comprise an elongated slot (to accept the second lever arm) that passes through the lever arm generally normal to the grip face and extends from a location adjacent the grip face, substantially beyond the hinge point to a location adjacent the terminal end of the arm. The second lever arm may comprise a generally rectangular cross-section that extends from the grip face of the second jaw member at an obtuse angle, passing through the hinge point and arcing into a plane generally parallel with the grip face. The width of this second lever arm, measured parallel to the hinge axis, may be substantially narrower than the jaw member from which it extends and somewhat narrower than the slot in the first lever arm through which it may pass.

The configuration of the lever arms as described allows them to cross through a common axis, with the second lever arm passing through the slot in the first lever arm. A hinge may thus be formed by inserting a pin through holes in each arm that align along this common axis, and to reinforce the hinge point the cross-section of each arm may be enlarged in the area adjacent the pin. By squeezing the lever arms together, a substantial pliers-like force can be applied to the grip teeth for securely engaging the sheet material. As an ergonomic aid, the second lever arm may be fitted with an array of ribs, knurls or other texturing at its outer crest that provide a slip free platform for the operator's thumb. The first lever arm may be equipped with a ribbed, knurled or otherwise textured depression on it terminal end that faces away from the second lever arm knurls and provide a slip free platform for one of the operator's fingers.

The clip assembly may further comprise an interim locking means that preserves jaw engagement pressure with the sheet material by maintaining some degree of lever arm activation force even after the user releases his hand from the lever arms. In the preferred embodiment, the securement element comprises a hook integrated into the terminal end of the second lever arm. The hook may be a natural extension of this lever arm and as such may arc towards the first lever arm and then wrap partially back on itself to form a semiannular hook which has a concentric axis parallel to the hinge axis and which opens generally towards the hinge. The width of the hook, in a direction parallel to the hinge axis, may be consistent with the width of the second lever arm from which it extends, and the combined length of the second lever arm and hook extension may be such that they could pass through the slot in the first lever arm if rotated unrestrained about the hinge axis.

With the lever arms in a relaxed, uncompressed state and the opposing jaw elements in contact with the sheet material to be stripped, the hook of the securement element will partially enter the slot of the first lever arm. By firmly depressing the lever arms, using the knurled thumb and finger platforms, the teeth on the opposing jaws engage the sheet material with high pressure. With additional finger pressure the lever arms may be resiliently deflected relative to each other such that the inner radius of the securement hook passes completely through the slot in the first lever arm and is exposed on the opposite side of the first arm. A rope or cord may then be looped on the exposed hook and interference of the rope between the hook and slot may prevent the lever arms from returning to their relaxed state even when finger pressure is removed. The material sheet will remain firmly gripped within the jaw teeth by the elastic lever arm activation force stored in the deflected lever arms, and the clip can be secured by fixing the free end of the rope to an anchored object. When the rope is removed, the lever arms elastically recover and pivot back into their relaxed state allowing the material sheet to be removed from the jaws. Operation of this embodiment relies on the relative compliance of the two lever arms, and these two lever arms may be configured, in terms of dimensions and material properties, to accommodate this requirement.

To facilitate installation of the clip to the sheet material and securement of the rope to the clip, an interim locking feature may be incorporated. In the preferred embodiment, the interim locking element may comprise opposed engaging ratchet lips, or pawls/detents, one lip being integrated into the side of the securement hook of the second lever arm and the opposing lip being integrated into the edge formed by the slot and outer face of the first lever arm. As discussed previously, by depressing the lever arms, the teeth on the opposing jaws engage and the lever arms may be elastically deflected relative to each other. When the appropriate clamping pressure has been obtained, the lever arms may be further deflected but in lateral relation to each other such that the opposing interim locking lips engage each other. By then releasing finger pressure, the lips remain engaged by the elastic recovery force locked in the deflected lever arms, and the material sheet remains firmly gripped within the jaw teeth. The position of the interim locking lips may be adjusted such that, when engaged, the securement hook is partially exposed through the slot in the first lever arm. The rope or cord may then be conveniently looped on the hook and secured. If the rope is removed from the hook, the interim locking lips may still engage maintaining jaw pressure on the material sheet until the lip activation motion is reversed.

The invention, together with further aspects and advantages thereof, may be further understood by a reading of the following detailed description with reference to the accompanying drawings.

BRIEF DESCRIPTION OF THE DRAWINGS

FIG. 3 is an isometric bottom view of the first gripper arm member of the clip assembly of FIG. 1;

FIG. 4 is an isometric top view of the second gripper arm assembly of FIG. 1;

FIG. 5 is a partial, front elevational view of the locking clip assembly of FIG. 1, showing the engagement and shape of the gripper teeth from the front of the assembly;

FIG. 6 is a partial, side elevational view of the locking clip assembly of FIG. 1, showing the engagement and shape of the raked gripper teeth from the side of the assembly;

FIG. 13 is an isometric bottom view of an additional embodiment of gripper/arm assembly similar to that in FIG. 1, this having a circular jaw configuration and a circular array of conical teeth;

FIG. 14 is an isometric bottom view of an additional embodiment of gripper/arm assembly similar to that in FIG. 1, this having a circular jaw configuration and an alternating concentric pattern of rubber pads and circular arrays of conical teeth;

FIG. 15 is an isometric bottom view of an additional embodiment of first gripper/arm assembly similar to that in FIG. 1, this having a rectangular array of teeth surrounded by a rubber lip and with the jaw edges radiused;

FIG. 16 is an isometric sectional view of an additional embodiment of locking clip assembly similar to that in FIG. 1, this having the hinge pin replaced by a reduced diameter hinge hub on the first lever arm and a slot added to the hinge hub of the second lever arm;

DETAILED DESCRIPTION a. Overview

Figure 1:
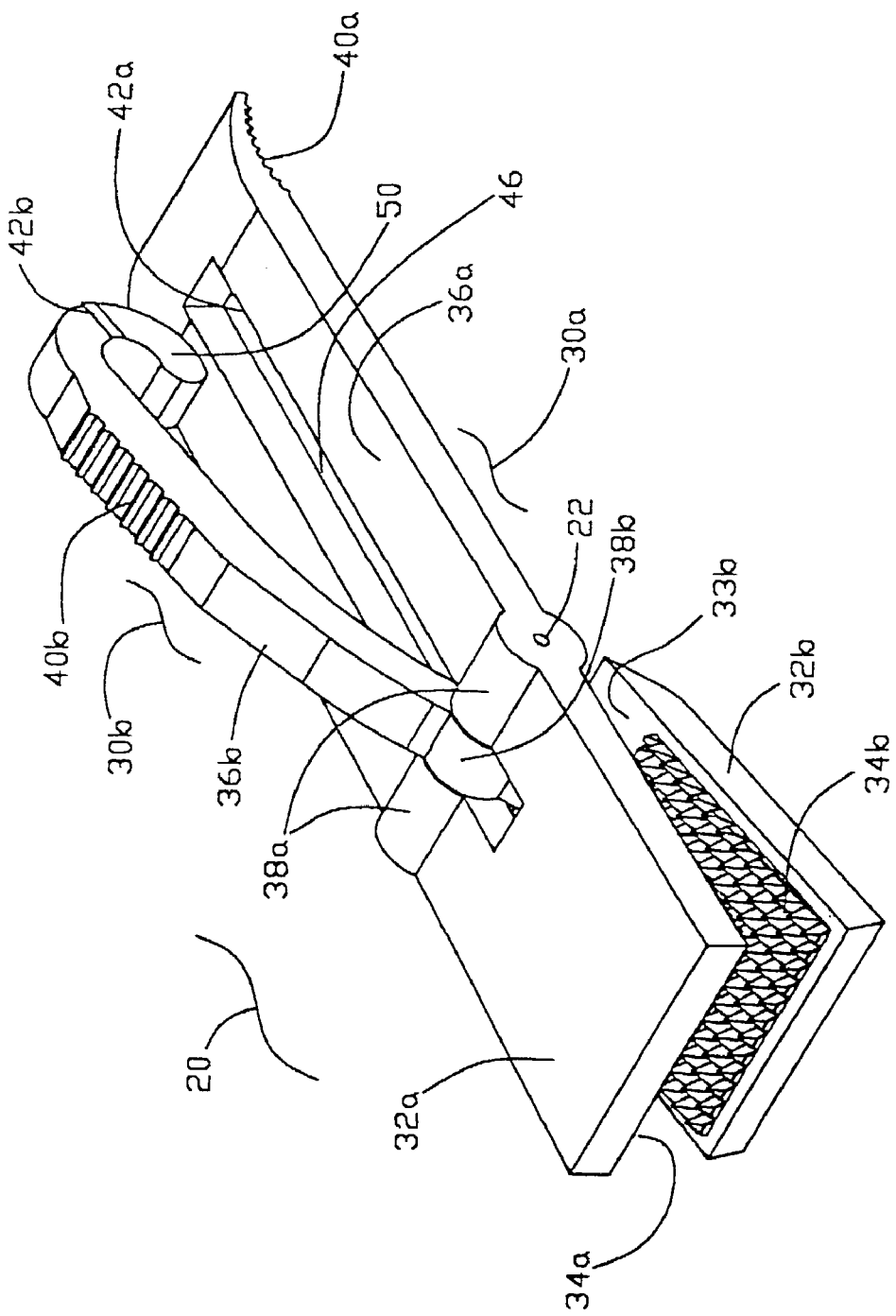
FIG. 1 is an isometric overview of a locking clip assembly in accordance with the present invention.
Figure 2:
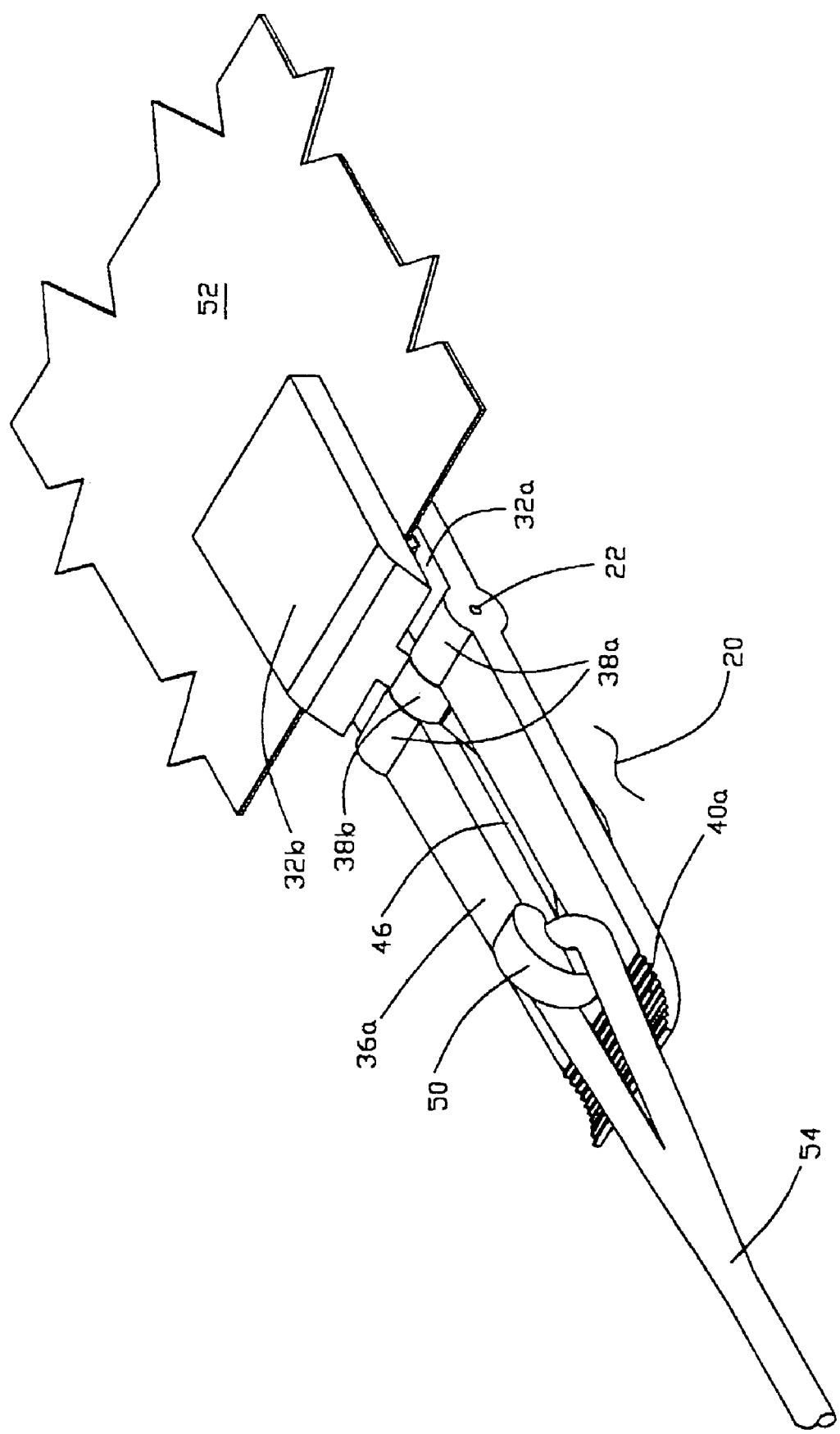
FIG. 2 is an isometric overview of the locking clip assembly of FIG. 1, showing this engaging a sheet of material and secured by a rope.

FIG. 1 shows a clip assembly 20 in accordance with the present invention, and FIG. 2 shows this clip assembly engaging a sheet of material 52 and secured by a rope 54. The preferred embodiment of the clip assembly 20 is formed of two major members, a first gripper arm member 30a (also shown in FIG. 3), and a second gripper arm member 30b (also shown in FIG. 4), which are joined by a hinge pin 22 in opposition to each other to form a pliers like arrangement for gripping a sheet of material 52.

Each of the first and second gripper arm members 30a, 30b includes several corresponding counterparts including (a) opposing first and second jaw portions 32a, 32b that provide structural support for the corresponding first and second grip elements 34a, 34b which engage the sheet of material 52; (b) first and second lever arm portions 36a, 36b that extend from the first and second jaw portions 32a, 32b to provide leveraged activation of the first and second jaws 32a, 32b; (c) first and second hinge hubs 38a, 38b having holes 44a, 44b that accommodate the hinge pin 22 and provide a common pivot point for activating the jaws 32a, 32b via the lever arms 36a, 36b; (d) first and second sets of lever arm ridges 40a, 40b that provide ergonomic slip-free platforms for the operator to squeeze the lever arms 36a, 36b between his finger and thumb, respectively; and, (e) first and second opposed, cooperating ratchet lips 42a, 42b that provide an interim locking means that preserves jaw engagement pressure with the sheet 52 even after the user releases his hand from the lever arms 36a, 36b.

In addition, the terminal end of the second lever arm 36b may be equipped with a hooked securement element 50 that concurrently provides a means for connecting the clip 20 to a rope 54 or similar cord, bungee, or other attachment element, and which further serves to lock the lever arms in the activated position until the rope or other attachment element is removed.

Although any of the various components comprising each gripper arm member 30a, 30b could be fabricated as an individual part and joined to the assembly by appropriate means, it is generally preferable that each gripper arm member 30a, 30b be formed as a single integral part incorporating the associated sub-components. This may be accomplished by injection molding each gripper arm member 30a, 30b of suitable plastic such that the entire clip assembly 20 requires only two or three parts, the first gripper arm member 30a, the second gripper arm member 30b, and in some embodiments the hinge pin 22. This arrangement is highly advantageous from the standpoint of simplicity, economy of manufacture, and durability. Glass-fiber filled nylon is particularly suitable for use in the present invention due to its combination of strength and resiliency, however, other materials such as, but not limited to, other plastics, metal, or composites may also be used so fabricate the gripper arm members 30a, 30b so long as they provide the appropriate amount of strength, resilience and relative compliance for the intended functionality. Additionally, other molding, machining, or manufacturing processes may be employed as well. The hinge pin may be fabricated from metal, plastic, or some other material; or it may be eliminated completely as discussed later with regard to additional embodiments.

b. Jaws and Grip Elements

The opposing first and second jaw members 32a, 32b may comprise generally rectangular platforms having generally planar faces 33a, 33b on which the grip portions 34a, 34b are formed or attached. To provide high contact area and strong grip strength while preserving compactness, the jaws 32a, 32b of the preferred embodiment, have a generally rectangular periphery shape approximately 1½ inches wide and 2 inches long. However, to achieve more contact area for additional grip strength, to minimize size for compact applications, or to meet other design improvements, these dimensions may be altered. Furthermore, although the periphery of the jaws on the preferred embodiment is generally rectangular other shapes may be used, as will also be discussed below with regard to additional embodiments.

To resist bending due to the squeezing action of the lever arms and to supply uniform pressure to the sheet material 52, the jaws 32a, 32b of the preferred embodiment are solid with a generally rectangular crossection approximately 1½ inches wide and ¼ inch thick, although other dimensions may be used depending on materials and other design factors. To save weight and material cost, the face opposite the grip face 33a, 33b may be strategically hollowed out leaving reinforcement ribs.

Although the opposing faces 33a, 33b of the jaws 32a, 32b may be configured to be either parallel or divergent when fully closed, it is generally preferable that they are arranged to become nearly parallel when a sheet of material 52 of typical nominal thickness is engaged between them. This arrangement provides more uniform pressure and, thus, enhanced grip. The preferred embodiment utilizes planar faces 33a, 33b on the jaws 32a, 32b, however, each face could be contoured or fashioned with reliefs that may or may not nest with the opposing face.

Although various grip type elements and materials may be used, in the preferred embodiment the grip portion of each jaw 32a, 32b is formed as a generally rectangular array of teeth 34a, 34b for engaging and retaining the sheet material 52. As illustrated in FIG. 5 and FIG. 6 the array of teeth 34a on the first grip face 33a may be configured to be received in the intersecting valleys between the array of teeth 34b on the second grip face 33b, and vice versa. By this arrangement, the sheet material 52 is forced into an interfitting "egg carton" pattern by the high contact pressure between the jaws, providing high contact area and enhanced resistance to pullout in all directions.

As shown in FIG. 6, the individual teeth 34a, 34b are generally pyramidal in shape but their peaks rake away from the sheet material and back towards the hinge point 22. The nested pyramidal teeth provide high contact pressure to engage the fabric and resist pullout. This effect is further enhanced by the rake angle, which opposes the pulling direction and thus provides additional contact pressure and more tenacious gripping action.

Other teeth shapes and configurations may be substituted for this preferred embodiment, for example continuous parallel ridges of teeth, circular arrangements of teeth, or gumdrop shaped teeth.

c. Lever Arms

Referring to FIG. 1 through FIG. 4, in the preferred embodiment the first lever arm 36a is a generally rectangular member formed as an integral extension of the first jaw portion 32a with an elongated slot 46 to accept the second lever arm 36b. The second lever arm 36b, in turn, extends from the grip face 33b of the second jaw member 32b and has a generally rectangular cross-section with a width, measured parallel to the hinge pin axis 22, which allows it to pass through the slot 46 in the first lever arm 36a. Both the first lever arm 36a and the second lever arm 36b have hinge hubs 38a, 38b with concentric holes 44a, 44b that accept hinge pin 22 and serve as the pivot point for activating the jaws 32a, 32b. By centering the second lever arm 36b within the slot 46 of the first lever arm 36a, the forces and torques generated on the hubs 38a, 38b and hinge pin 22 by the squeezing pressure are more evenly balanced, minimizing stress on the parts, reducing the required lever arm and hub cross-sections, and eliminating the need for high strength materials. However, other lever arm configurations may be used. For instance, two parallel arms of comparable cross-section, and without any slots, could be assembled adjacent to each other with the corresponding extended jaws opposingly offset from each arm along the hinge axis to allow them to centrally align along an axis perpendicular to the hinge pin and through its midpoint, resembling a conventional set of pliers in outward appearance.

The length of the lever arms 36a, 36b determines the amount of leveraged force that can be applied to the jaws 32a, 32b and consequently the amount of grip strength achieved on the sheet material 52. To provide high grip strength while preserving compactness, the lever arms 36a, 36b, of the preferred embodiment, are approximately 3 inches long. However, to achieve additional grip strength, the arms may be lengthened, or, to minimize size for compact applications, the arms may be shortened. As discussed previously, maintaining appropriate relative bending compliance of the lever arms 36a, 36b is necessary to properly operate the interim locking mechanism and to allow securement of the clip 20 to a rope 54 or other attachment element. The cross-sectional dimensions of the lever arms 36a, 36b combined with their length and the material from which they are made regulates this relative bending compliance. By making the first lever arm 36a approximately ¼ inch thick, 1½ inches wide and with a ¼ inch slot 46, and making the second lever arm 36b approximately ¼ inch thick and just under ¼ inch wide, an appropriate compliance is achieved on the preferred embodiment when using 40% glass-filled nylon material. However, these dimensions may be varied to accommodate variations in lever arm length and material properties, or to achieve different interim locking pressures or securement pressures. In addition, other cross-sectional shapes may be used for the lever arms 36a, 36b, and the cross-sectional shape and dimensions may vary along the length of the arms.

Because the pivot joint may see elevated stresses due to the high clamping loads, the lever arms 36a, 36b are fitted with hinge hubs 38a, 38b to reinforce them. In the preferred embodiment the hinge hubs 38a, 38b are cylindrical distensions concentrically located about the hinge pinholes 44a, 44b. However other hub reinforcement shapes may be used or they may be eliminated entirely if adequate strength can be achieved without them. In addition, the hinge hub 38b may be widened along the hinge pin 22 axial direction so as to be nearly as wide as the slot 46 in the first lever arm 36a. The flat faces of the hubs 38a, 38b would then provide the pivot contact surface for hinged operation and the second lever arm width, along the hinge pin 22 axial direction, could be reduced as desired.

To aid the operator in squeezing the lever arms 36a, 36b together and in deflecting them to activate the interim locking element, each lever arm is preferably equipped with an ergonomic slip free platform 40a, 40b having suitable surface texturing. In the preferred embodiment, the first lever arm 36a has a platform 40a on its bottom surface adjacent its terminal end and comprising a shallow cylindrical recess with a cylindrical array of parallel ridges that accepts the operator's index or middle finger. The second lever arm 36b has a platform 40b on the crest of its upper surface and comprising a linear array of parallel ridges that accepts the operator's thumb. It will be understood that other suitable forms of surface texturing may be employed in the appropriate areas.

By squeezing the thumb and finger together, the lever arms 36a, 36b are activated, engaging the jaws 32a, 32b on the sheet material 52. By then deflecting the thumb and finger in laterally opposed directions, the lever arms are likewise deflected such that the interim locking mechanism may be engaged.

d. Interim Locking Element and Securement Mechanism

Figure 7:
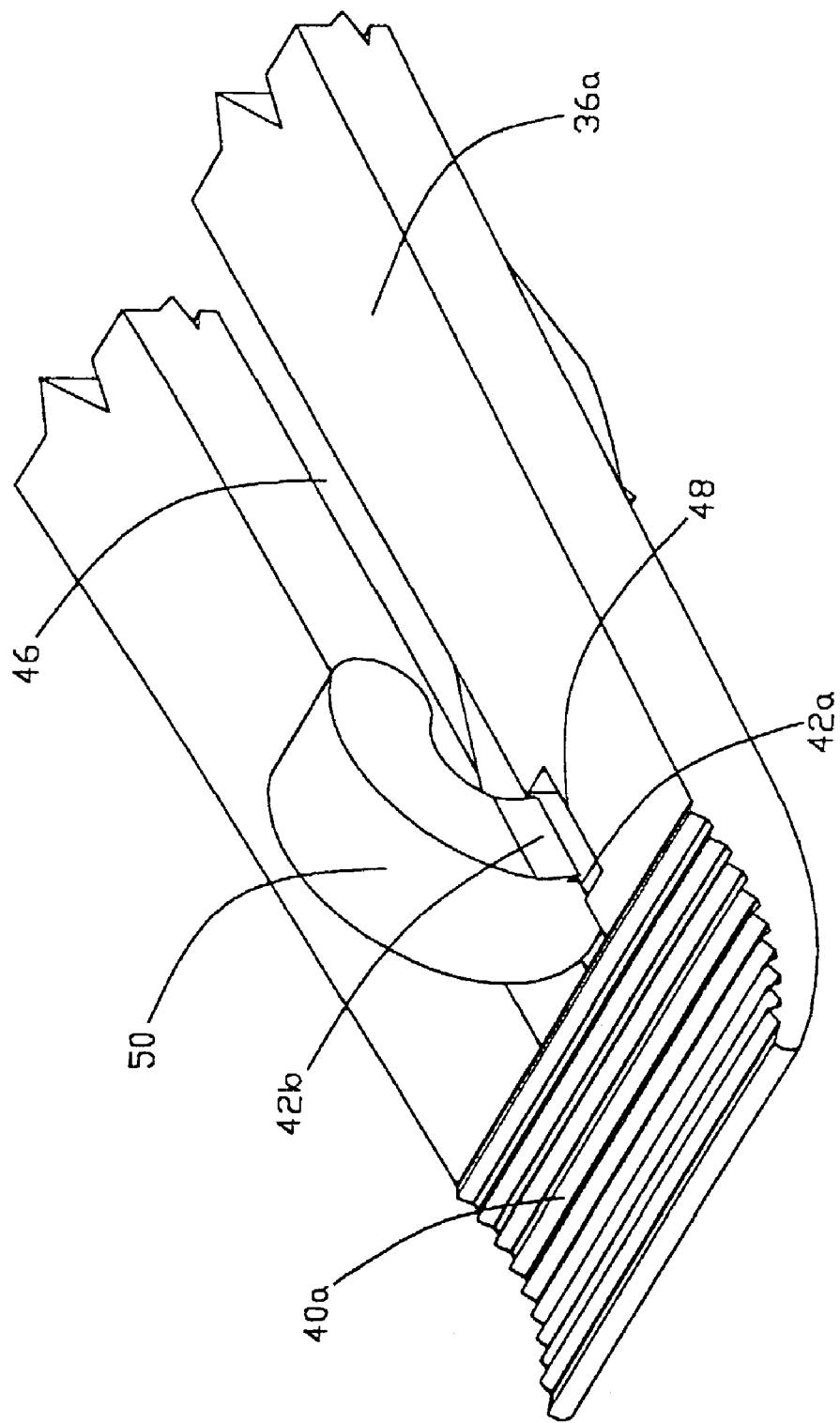
FIG. 7 is a partial, isometric view of the locking clip assembly of FIG. 1, showing details of the interim locking mechanism thereof.

The interim locking mechanism for the preferred embodiment is illustrated in FIG. 7 and comprises two opposed engaging ratchet lips 42a, 42b, one located on each lever arm 36a, 36b adjacent its terminal end. The first ratchet lip 42a may be formed from the edge of a drafted rectangular depression 48 formed in the bottom surface of the first lever arm 36a, adjacent the lever arm slot 46 and near its terminal end. The second ratchet lip 42b may comprise a triangular protrusion formed on the side of the securement hook 50 with its ridge pointing towards and opposing the first ratchet lip 42a. The interim locking mechanism may be engaged by squeezing the lever arms 36a, 36b together until the second ratchet lip 42b is deflected beyond the bottom surface of the first lever arm 36a, and then laterally deflecting the lever arms 36a, 36b relative to each other until the side of the second lever arm 36b contacts the edge of the slot 46 in the first lever arm 36a. At this point the ratchet lips 42a, 42b will be vertically aligned such that they overlap in embodiment, and engagement can be completed by relaxing the squeeze pressure on the lever arms 36a, 36b.

Although the preferred embodiment has a single opposing lip on the hook 50 of the second lever arm 36b, a linear array of lips may be used to form a multiple ratcheting mechanism that provides variable retained grip pressure. It will be understood that various forms of pawls or teeth may be substituted for the ratchet lips that are shown, or different interim locking mechanisms may be employed.

Referring to FIG. 1 and FIG. 2, the securement element provides a means of connecting the clipped sheet of material 52 to a rope 54 or other connective element that is subsequently anchored to a fixed point. In the preferred embodiment, the securement element consists of a semi-enclosed hook 50. The hook 50 has a generally rectangular cross-section, approximately ¼ inch wide and ¼ inch deep, that extends from the terminal end of the second lever arm 36b and arcs approximately 190 degrees. The inner diameter may be approximately ¼ inch to accept a rope 54 or bungee of that size or smaller. However, the dimensions and section shape of the hook may vary so long as proper operation can be sustained without interference of the hook 50 with the second lever arm slot 46. Use of a hook 50 as the securement element allows a loop of rope 54 or other cord to be quickly and conveniently pulled over the hook and secured, a great advantage when numerous clips 20 are being installed, such as on a large tarp or sheet of plastic at a construction site, for example. It may also be advantageous for specific applications such as when securing a trucking tarp. With a series of clips 20 installed on the edge of the tarp so as to individually align between a series of hooks on the trailer frame, a rope can then be zigzagged between the clip hooks (50) and the truck hooks to secure the tarp.

Although a hook 50 is used for the preferred embodiment, other securement element configurations may also be used. For instance a full annular loop could be substituted for the hook 50 and a rope could be fed through the eye and tied. Or, other securement means may be combined with the hook 50, such as a hole placed in the second lever arm to accept the wire hook found on the ends of many bungee cords. This hole would be strategically positioned such that when installed, the bungee hook would interfere with the first lever arm slot 46, and provide the same grip jaw preload as the rope 54 and hook 50 arrangements.

e. Operation

FIGS. 8-12 illustrate the operation of the clip assembly 20.

Figure 8:
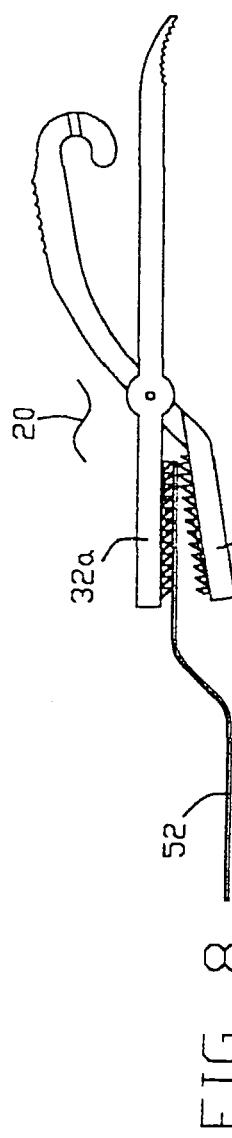
FIG. 8 is a side elevational view of the locking clip assembly of FIG. 1, showing the jaws in an open position with a sheet of material inserted between the jaws.
Figure 9:
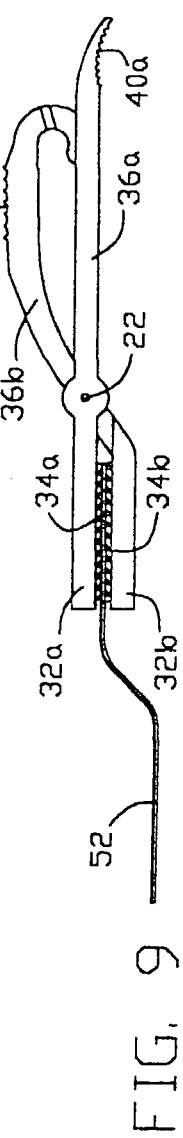
FIG. 9 is a side elevational view of the locking clip assembly of FIG. 1, showing the jaws beginning to engage a sheet of material inserted between the jaws.

In FIG. 8 the clip is open and the sheet material 52 is inserted between the jaws 32a, 32b. In FIG. 9 the lever arms 36a, 36b opposingly rotate relative to each other about the hinge pin 22 as they are squeezed together using the ridged finger and thumb platforms 40a, 40b. The lever arms 36a, 36b continue to rotate until the teeth 34a, 34b, of the opposing teeth 34a, 34b, contact the sheet material 52 and clench it in an interfitting pattern that undulates within the space between the teeth 34a, 34b.

Figure 10:
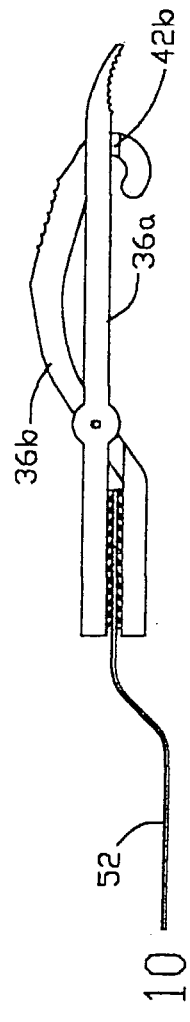
FIG. 10 is a side elevational view of the locking clip assembly of FIG. 1, showing the lever arms with pressure applied such that the jaws fully engage a sheet of material, the lever arms deflect, and the interim locking element engages.

As can be seen in FIG. 10, squeeze pressure is then applied to the lever arms 36a, 36b so that these bend resiliently relative to each other about the hinge pin axis. When the second ratchet lip 42b is deflected beyond the bottom surface of the first lever arm 36a, the interim locking mechanism can be engaged by laterally deflecting the lever arms 36a, 36b relative to each other and releasing the lever arm pressure. At this point, the clip assembly 20 is in firmly engagement with the sheet material 52, with its grip being sustained by the compressive force stored elastically in the deflected lever arms 36a, 36b.

Figure 11:
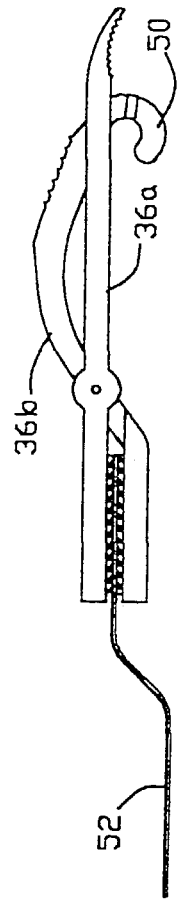
FIG. 11 is a side elevational view of the locking clip assembly of FIG. 1, showing the lever arms with additional pressure applied such that the jaws fully engage a sheet of material, the lever arms fully deflect, and the securement hook is fully exposed through the slot in the first lever arm.
Figure 12:
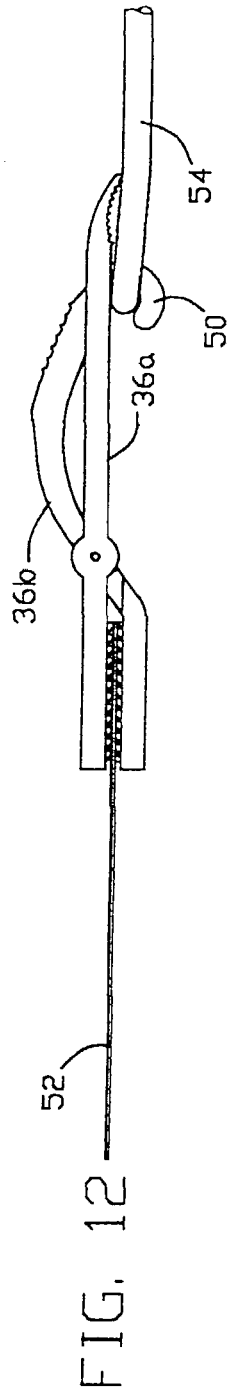
FIG. 12 is a side elevational view of the locking clip assembly of FIG. 1, showing this fully installed on a sheet of material and secured to an anchor by a rope.

To then secure the engaged clip 20 to a fixed anchor via a rope or other cord, the lever arms 36a, 36b are squeezed with even greater engagement pressure so that they deflect relative to one other until the inner radius of the securement hook 50, which is the portion for attachment of the cord, passes completely through the slot 46 in the first lever arm 36a and is exposed on the opposite side of the first lever arm, as is shown in FIG. 11. As can be seen in FIG. 12, a rope 54 or other cord, can then be looped or tied on the exposed hook 50 so that this creates an interference between the hook 50 and slot 46 that prevents the lever arms 36a, 36b from returning to their relaxed state even when finger pressure is removed. A great deal of grip pressure can be applied to the sheet material 52 and retained by this arrangement. As is shown in FIG 12, the sheet material 52 can then be stretched taut by tightening the rope 54 and securing it to an anchor. The entire operation may be reversed to remove the clip 20 and free the tarp or other sheet material 52.

Aside from retaining the clip 20 to the sheet 52, the interim locking mechanism also enhances the convenience and speed of attaching the securement rope 54 under various circumstances. As is shown in FIG. 10, the securement hook 50 is partially exposed on the opposite side of the first lever arm 36a when in this position. The geometry of the hook 50 with a rounded ramp leading into its opening, is such that a rope loop can then be wedged between the hook tip and first lever arm 36a and pulled so as to pry the second lever arm 36b to a more depressed position that allows the rope to seat fully within the hook 50.

e. ADDITIONAL EMBODIMENT

In addition to the preferred embodiment described above, other forms and variations may be implemented that remain within the spirit and scope of the invention.

For instance, although the jaws 32a, 32b have a rectangular peripheral shape and a rectangular array of teeth 34a, 34b in the preferred embodiment, a circular jaw configuration 56 having a circular array of teeth 58 may be used as shown in FIG. 13. Other jaw configurations and teeth arrangements may be used as well. In addition, the teeth shape may vary, as illustrated by the conical teeth 58 in FIG. 13, or the teeth may be replaced or enhanced by other forms of grip elements. For instance, high friction rubber pads may serve as a substitute for both sets of gripper teeth or teeth may be retained on one jaw and a rubber pad substituted for the teeth on the opposing jaw or alternating patterns of teeth and rubber could be used on a single jaw. This latter arrangement is illustrated in FIG. 14, which demonstrates alternating concentric rings of rubber 60 and conical teeth 62. Such a configuration may combine the mechanical engagement of teeth with the frictional adhesive properties of rubber to provide enhanced grip on the sheet material.

A variation of the arrangement illustrated in FIG. 14 is shown in FIG. 15 in which an outer rubber lip 64 surrounds the periphery of a rectangular array of teeth 66, and the edges of the jaw 34a are provided with an appreciable fillet radius 68. By implementing these features, concentrated contact pressure between the sheet material and teeth 66 along the edge of the jaws 34a may be reduced providing a transition zone that gradually and uniformly transfers load into the sheet material, thus preserving the sheet integrity and increasing pull-out strength.

In addition to various arrangements for gripping sheet materials, the jaw portions may be configured or include portions for gripping or holding a variety of articles and materials in addition to or in place of the tarps and sheet materials described above, including ropes, rods, railings, and so on, for example.

Another embodiment is shown in FIG. 16. In this example the diameter of the hinge hub 44a on the first lever arm 36a has been reduced, and a slot 70 has been added to the hinge hub 44b on the second lever arm 36b. In this manner, the reduced diameter hub 44a substitutes for the hinge pin 22, which can then be eliminated so as to reduce the total part count to two and enhance the economy of the assembly. The clip 20 can be assembled by sliding the lever arm 36b of the second gripper/arm assembly 30b through the slot 46 in the first gripper/arm assembly 30b and then inserting the reduced diameter hub into the slot 70. Retaining lips may be added to the hub slot 70 to lock the joint in place, in which case a snap fit may be used for assembly.

Figure 17A:
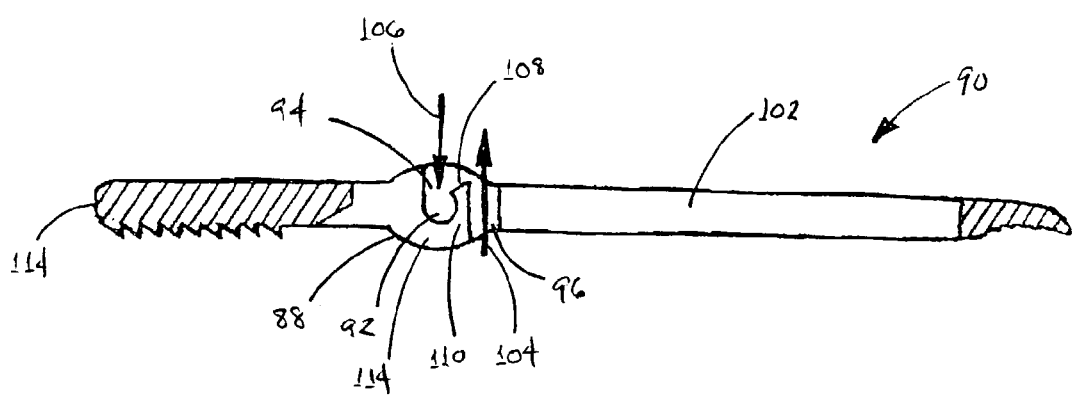
FIGS. 17A and 17B are, respectively, sectional, elevational views of the upper and lower gripping members of the clip assembly in accordance with another embodiment of the present invention, in which the pivot connection is formed by interfitting bosses and sockets on the two members, and in which the hook portion of the upper member includes a supplemental opening for attachment to a hook of a shock cord or similar member.
Figure 17B:
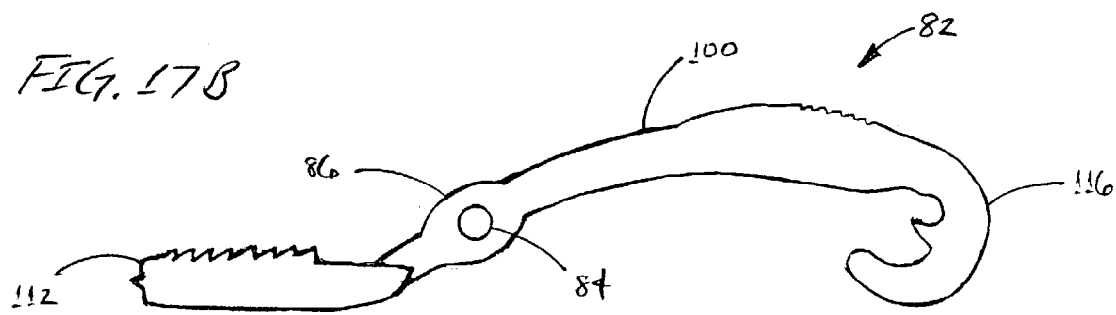

FIGS. 17A-17B show the upper and lower arm members for the clip assembly in accordance with another embodiment of the present invention, this being generally similar to the embodiments described above except for the structure forming the pivot connection between the arm members and also an inclusion of a supplemental opening in the hook portion of the upper arm member for cooperating with the hook at the end of a shock cord or the like.

With regard to the pivot connection, it can be seen that the upper arm 82 of the assembly includes a pair of generally cylindrical bosses 84 that protrude laterally on both sides of the pivot hub 86. The hub portions 88 of the lower pivot arm 90, in turn, include corresponding generally cylindrical sockets 92 that are sized and shaped to form a pivoting interfit with the bosses 84 of the upper lever arm. On the upper side of each of the sockets 92 there is an opening 94 having a width slightly smaller than the diameter of the bosses 84. Channels 96, in turn, extend vertically through the rearward portions of the hubs 88 and have a width that is larger than the diameter of the bosses. To connect the two arm members and therefore assemble the clip assembly, the arm portion 100 of the upper lever arm is passed through the longitudinal opening 102 in the lower arm, and the two bosses 84 are slid upwardly through channels 96 in the direction indicated by arrow 94. The bosses are then moved forwardly and downwardly into the sockets 92, in the direction indicated by arrow 106. As this is done, a ramp portion 108 on the upper edge of the wall 110 between the channels and sockets helps to guide the hubs into the sockets and also aids in bending wall 110 rearwardly in response to a downward pressure on the bosses in the direction indicated by arrow 106. The causes openings 94 to spread to a sufficient width that the bosses 84 are able to fully enter the sockets 92, after which the wall 110 returns resiliently to its original position so that the bosses are retained in pivoting engagement with the sockets.

Once assembled, forces on the bosses 84 that are generated by the clamping action of the jaw portions 112, 114 are transferred into and born by a thick wall portion 114 of the hubs that surrounds the lower ends of the sockets 92, rather than at the openings, 94. The embodiment shown in FIGS. 17A-17B thus forms a rapidly assembled pivot connection that is not subject to spreading and does not require a separate pivot pin.

Figure 18:
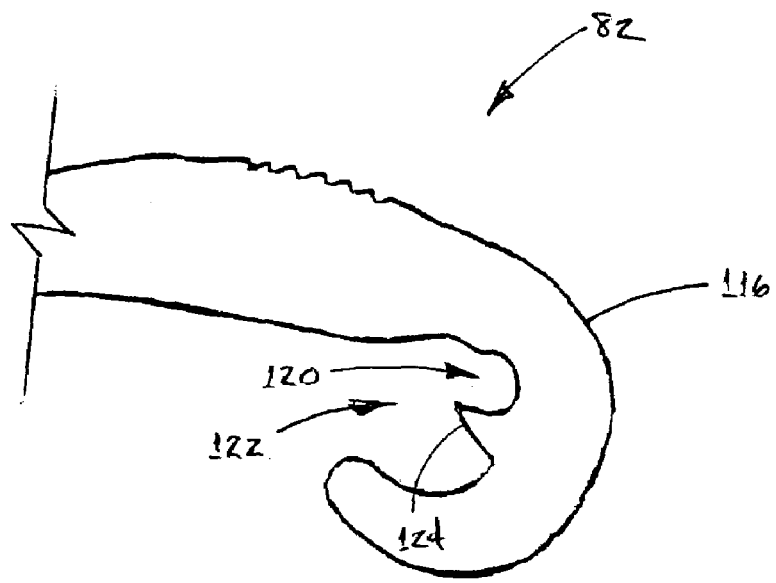
FIG. 18 is a partial, enlarged elevational view of the hook portion of the upper arm member of FIG. 17B, showing the configuration of the supplemental opening therein in greater detail.

As noted above, in the embodiment shown in FIGS. 17A-17B also includes a supplemental opening in the hook portion 116 at the end of the upper lever arm. As can be seen in FIG. 18, the supplemental opening 120 is formed as a small, generally cylindrical opening within the upper, rearward portion of the main opening 122 of the hook portion 116, the latter functioning to hold a rope or other cord in essentially the same manner as described above. The supplemental opening 120, in turn, is sized to have a diameter approximately equal to or larger than the diameter of the material forming a hook on the end of a shock cord (commonly referred to as a "bungee cord"), such hooks conventionally being formed by heavy gauge bent wire. As can be seen in FIG. 18, the lower side of the supplemental opening is formed by somewhat hook-shaped wall 124 having upper lip that projects upwardly at the entrance into the opening.

Figure 19:
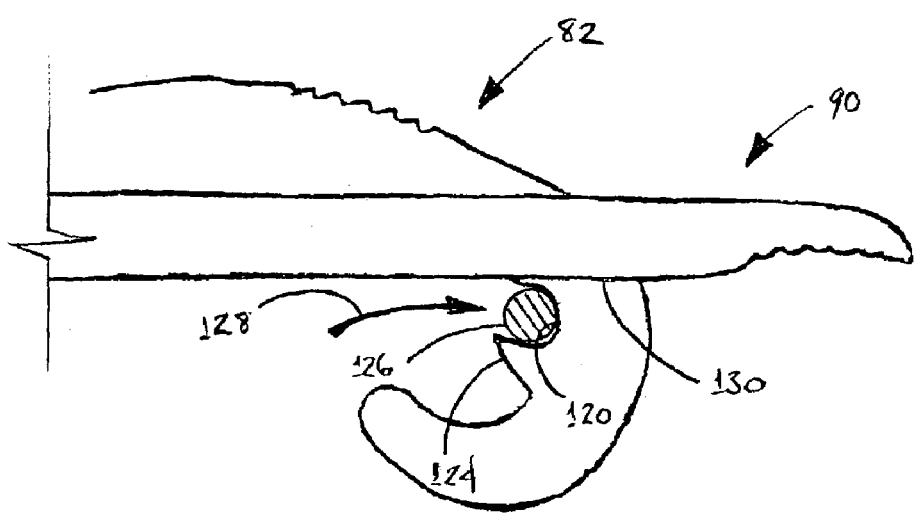
FIG. 19 is a partial, elevational view, similar to FIG. 18, showing the manner in which the lower arm member of the clip assembly cooperates with the hook of a shock cord or the like so as to exert a gripping force when the latter is received in the supplemental opening of the hook portion.

Thus, to use the clip assembly with a shock cord, the upper and lower lever arms are pressed together so as to exert a gripping force in the manner described above, until the hook portion of the upper lever arm deflects resiliently downwardly to a point where the secondary opening 120 is located slightly below the lower lever arm 90, as shown in FIG. 19. The hook 126 on the shock cord (shown in cross section in FIG. 19) is then inserted into the secondary opening in the direction indicated by arrow 128. When finger pressure is released, the lower surface 130 of the lower lever arm bears against the hook 126, preventing the lever arms from spreading apart and thereby maintaining the grip exerted by the clip assembly. Simultaneously, the upwardly-projecting lip of the hook-shaped wall 124 on the one side and the pressure of the lower lever arm 90 on the other cooperate to hold the hook 126 normally in place and prevent it from escaping from opening 120.

In this manner, a secondary hook opening in the embodiment shown in FIGS. 18-19 (which may be used in other embodiments in addition to that having the form of pivot connection shown in FIGS. 17A-17B) allows very quick and secure attachment of top cords to tarps and the like, with the operator simply squeezing the lever arms of the clip in one hand and inserting the hook of the shock cord with the other.

The foregoing description of the preferred embodiment of the invention has been presented for the purpose of illustration and description. It is not intended to be exhaustive or to limit the invention to the precise form disclosed. Many modifications and variations are possible in light of the above teaching.

What is claimed is:

1. A clip assembly, comprising:
   a first gripping member, comprising:
   a jaw;
   a first pivot portion; and
   an elongate arm and having an opening formed therein; and
   a second gripping member, comprising:
   a jaw;
   a second pivot portion for engaging said first pivot portion so as to pivotally connect said first and second gripping members;
   an elongate arm so that said jaws are forced into gripping engagement in response to said arms being pressed together; and
   a hook portion integrally formed on said elongate arm of said second gripping member for receiving a portion of a cord therein said hook portion comprising:
   a primary opening for receiving a bight of rope therein; and
   a secondary opening for receiving a hook of a shock cord therein;

at least one of said arms being formed of substantially rigid, resiliently flexible material so that as said jaws are forced into engagement said arm formed of flexible material bends resiliently to a compressed position in which an attachment portion on said arm of said second gripping member passes through said opening in said arm of said first gripping member, so that when said portion of said cord is received in said attachment portion an interference is formed that locks said arms in said compressed position with said jaws forced into gripping engagement.

2. The clip assembly of claim 1, further comprising:
means for temporarily retaining said at least one arm formed of rigid, resiliently flexible material in a partially compressed position.

3. The clip assembly of claim 2, wherein said means for temporarily retaining said arm in a partially compressed position comprises:
a pawl tooth formed on one of said arms; and
a recess formed on the other of said arms for receiving said pawl tooth when said at least one arm is in said partially compressed position.

4. The clip assembly of claim 1, wherein said arms of both said first and second gripping members are formed of substantially rigid, resiliently flexible material so that both of said arms bend resiliently as said jaws are forced into engagement.

5. A clip assembly, comprising:
a first gripping member comprising:
a pivot portion;
a jaw portion on one side of said pivot connection; and
an elongate arm portion on an opposite side of said pivot portion, said arm portion comprising:
a substantially straight lever arm;
an elongate, closed-ended slot opening formed lengthwise in said straight lever arm; and
a finger grip extension formed on a distal end of said straight lever arm; and
a second gripping member, comprising:
a pivot portion in pivoting engagement with said pivot portion of said first gripping member;
a jaw portion on one side of said pivot portion of said second gripping member; and
an elongate arm portion on an opposite side of said pivot portion of said second gripping member, said arm portion comprising:
a substantially curved lever arm;
a middle portion of said curved lever arm that extends through said slot opening in said straight lever arm of said first gripping member so that said middle portion of said curved lever arm projects above said straight lever arm when said jaw portions are in face-to-face contact;
a thumb engagement area formed on said middle portion of said curved lever arm that projects above said straight lever arm, so that said lever arms of said first and second gripping members can be pressed together between a thumb on said engagement area and a finger under said grip extension so as to force said jaw portions together in gripping engagement; and
a distal hook portion having receiving opening formed on a side of said curved lever arm opposite said thumb engagement area;
at least one of said lever arms being resiliently flexible, so that in response to said projecting middle portion of said curved lever arm being depressed towards said straight lever arm said hook portion deflects resiliently through said slot opening to a compressed position in which a cord received in said opening establishes an interference that locks said jaw portions together in gripping engagement.

6. The clip assembly of claim 5, wherein said pivot portion of said first gripping member comprises a pair of closed-ended channels formed on sides of said elongate slot opening and having U-shaped ends, and wherein said pivot portion of said second gripping member comprises a pair of pivot pins formed on sides of said curved lever arm that are received in said U-shaped ends of said channels in pivoting engagement therewith.

7. The clip assembly of claim 6, wherein said arm portion of said first gripping member further comprises:
first and second open-ended channels formed on sides of said elongate slot opening that permit said pivot pins to pass therethrough as said curved lever arm is inserted through said slot opening during assembly of said first and second gripping members.

8. The clip assembly of claim 5, wherein said thumb engagement area comprises a convexly-curved surface having texturing for frictionally engaging an end of a thumb.

9. The clip assembly of claim 8, wherein said finger grip extension comprises:
a concavely-curved surface having texturing for engaging a side of a finger.

* * * * *